US008582116B2

(12) United States Patent
Ebihara et al.

(10) Patent No.: US 8,582,116 B2
(45) Date of Patent: Nov. 12, 2013

(54) RECORDING SHEET SURFACE DETECTION APPARATUS AND IMAGE FORMING APPARATUS

(75) Inventors: Shun-ichi Ebihara, Suntou-gun (JP); Tsutomu Ishida, Mishima (JP); Shoichi Koyama, Susono (JP); Norio Matsui, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 855 days.

(21) Appl. No.: 12/754,454

(22) Filed: Apr. 5, 2010

(65) Prior Publication Data

US 2010/0259772 A1 Oct. 14, 2010

(30) Foreign Application Priority Data

Apr. 14, 2009 (JP) ................................ 2009-098145

(51) Int. Cl.
*G01B 11/30* (2006.01)

(52) U.S. Cl.
USPC .......................................................... 356/600

(58) Field of Classification Search
USPC ............... 358/1.9, 2.1, 3.06, 3.21, 3.24, 3.26, 358/1.13-1.15, 504, 406, 468, 296, 300; 399/9, 24, 27; 347/14, 19, 112; 356/600, 445-448, 429, 408
See application file for complete search history.

(56) References Cited

U.S. PATENT DOCUMENTS 4,750,140 A * 6/1988 Asano et al. .................. 382/108
5,109,236 A * 4/1992 Watanabe et al. ............. 347/193
6,853,393 B2 2/2005 Akita
7,505,703 B2 * 3/2009 Akita et al. ..................... 399/45
2002/0191209 A1 12/2002 Yasumura
2003/0137679 A1 7/2003 Nakazawa
2006/0083129 A1 4/2006 Yun
2008/0169438 A1 * 7/2008 Murata .................... 250/559.07
2008/0181693 A1 7/2008 Cobene

FOREIGN PATENT DOCUMENTS

JP 4-364451 A 12/1992
JP 10-268731 A 10/1998
JP 2001-063870 A 3/2001
JP 2004-038879 A 2/2004
JP 2005-234472 A 9/2005
JP 2006-58261 A 3/2006
JP 2007-57891 A 3/2007
WO 03/086771 A2 10/2003

* cited by examiner

*Primary Examiner* — Kara E Geisel
*Assistant Examiner* — Dominic J Bologna
(74) *Attorney, Agent, or Firm* — Canon USA, Inc., IP Division

(57) ABSTRACT

An image forming apparatus for detecting surface conditions of a recording sheet on which an image is formed, includes a light source configured to emit a first light beam and a second light beam, an image capture device configured to capture a first image of a surface of the recording sheet illuminated with the first light beam and a second image of the surface of the recording sheet illuminated with the second light beam. A first straight line including a ray in a center of the first light beam and a second straight line including a ray in a center of the second light beam intersect with each other, when each straight line is projected onto the surface of the recording sheet, and a detection device configured to detect information about the unevenness on the surface of the recording sheet based on the first image and the second image.

19 Claims, 20 Drawing Sheets

RECORDING SHEET SURFACE DETECTION APPARATUS AND IMAGE FORMING APPARATUS

BACKGROUND OF THE INVENTION

1. Field of the Invention

The present invention relates to a recording paper surface detection apparatus that detects surface conditions of a recording sheet based on a surface image formed by an image capture device, and also to an image forming apparatus that controls image forming conditions based on the result of recording paper surface detection.

2. Description of the Related Art

With image formation apparatuses such as copying machines and laser beam printers, a developed image made visible by a developing device is transferred onto a recording sheet under predetermined transfer conditions, and heat and pressure are applied to the recording sheet under predetermined fixing conditions to fix the transferred image thereon.

In thus-configured conventional image forming apparatuses, for example, the size and type of recording sheet are set by the user on an operation panel provided thereon (hereinafter, the type of recording sheet is referred to as paper type). Transfer conditions (including transfer bias and conveyance speed of the recording sheet at the time of image transfer) and fixing conditions (including fixing temperature and conveyance speed of the recording sheet at the time of fixing) are controlled based on the setting on the operation panel.

Japanese Patent Application Laid-Open No. 2004-38879 discusses a technique including: capturing surface conditions of a recording sheet by using an area sensor; detecting the surface smoothness from the captured surface image; determining the paper type of the recording sheet; and controlling transfer conditions and/or fixing conditions based on the result of paper type determination. This technique for capturing a surface image of the recording sheet by using an area sensor excels in paper type determination accuracy since the shadow produced by the surface unevenness is directly captured. In particular, the method provides a high paper type determination accuracy when the presence or absence, size, and depth of the surface unevenness can be definitely distinguished in visual way, for example, when distinguishing between coated paper and non-coated paper (plain paper).

However, when determining the paper type of a general recording sheet for office use, for example, shadow conditions produced by the surface unevenness largely depend on the direction of fiber arrangement, i.e., paper making (hereinafter referred to as fiber arrangement direction). More specifically, when the paper surface is illuminated with light from a direction of irradiation that perpendicularly intersects with the fiber arrangement direction, a captured image provides high contrast emphasizing the surface unevenness. However, when the paper surface is illuminated with light from the same direction as the fiber arrangement direction, a captured image provides low contrast because of indistinct shadow produced by the surface unevenness. Therefore, even for the same type of paper, the contrast of the captured image largely differs leading to different results of paper type determination between longitudinal and lateral sheet passing.

With the technique in Japanese Patent Application Laid-Open No. 2004-38879, the recording sheet is illuminated with light from an oblique direction, specifically, at 15 to 70 degrees with respect to the recording sheet conveyance direction on the premise that the fiber arrangement direction of almost all paper types fits into an angular range from 0 (coincidence) to ±15 degrees with respect to the recording sheet conveyance direction or a direction perpendicularly intersecting with it. An image of this light illuminated area is captured by the area sensor to improve the paper type determination accuracy. However, the fiber arrangement direction of the recording sheet depends on the compounding rate of raw materials in the manufacture process. In recent years, however, recording paper has been produced through diverse manufacture processes on various manufacture sites, which results in diverse fiber arrangement directions. Therefore, the fiber arrangement direction does not necessarily fit into the angular range from 0 (coincidence) to ±15 degrees with respect to the longitudinal or lateral direction of the recording sheet. Therefore, with the technique in Japanese Patent Application Laid-Open No. 2004-38879 in which a surface image of one area illuminated with light from one direction is captured, an identical recording sheet may give different results of paper type determination depending on a relation between the fiber arrangement direction and the light illumination direction.

SUMMARY OF THE INVENTION

The present invention is directed to reducing variation in detection result caused by a relation between the fiber arrangement direction of a recording sheet and the direction of light illumination to improve the paper type determination accuracy for recording sheets having any fiber arrangement direction.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

However, the present invention is not limited to exemplary embodiments described below; specifically, dimensions, materials, shapes, and relative positions of members in the exemplary embodiments described below may be modified in diverse ways depending on apparatuses to which the present invention is to be applied and on various conditions.

An image forming apparatus including a recording paper surface detection apparatus according to a first exemplary embodiment of the present invention will be described below. The image forming apparatus including the recording paper surface detection apparatus according to the first exemplary embodiment will be described first. Then, a recording paper surface detection apparatus used for the image forming apparatus will be described in detail.

Figure 1A:
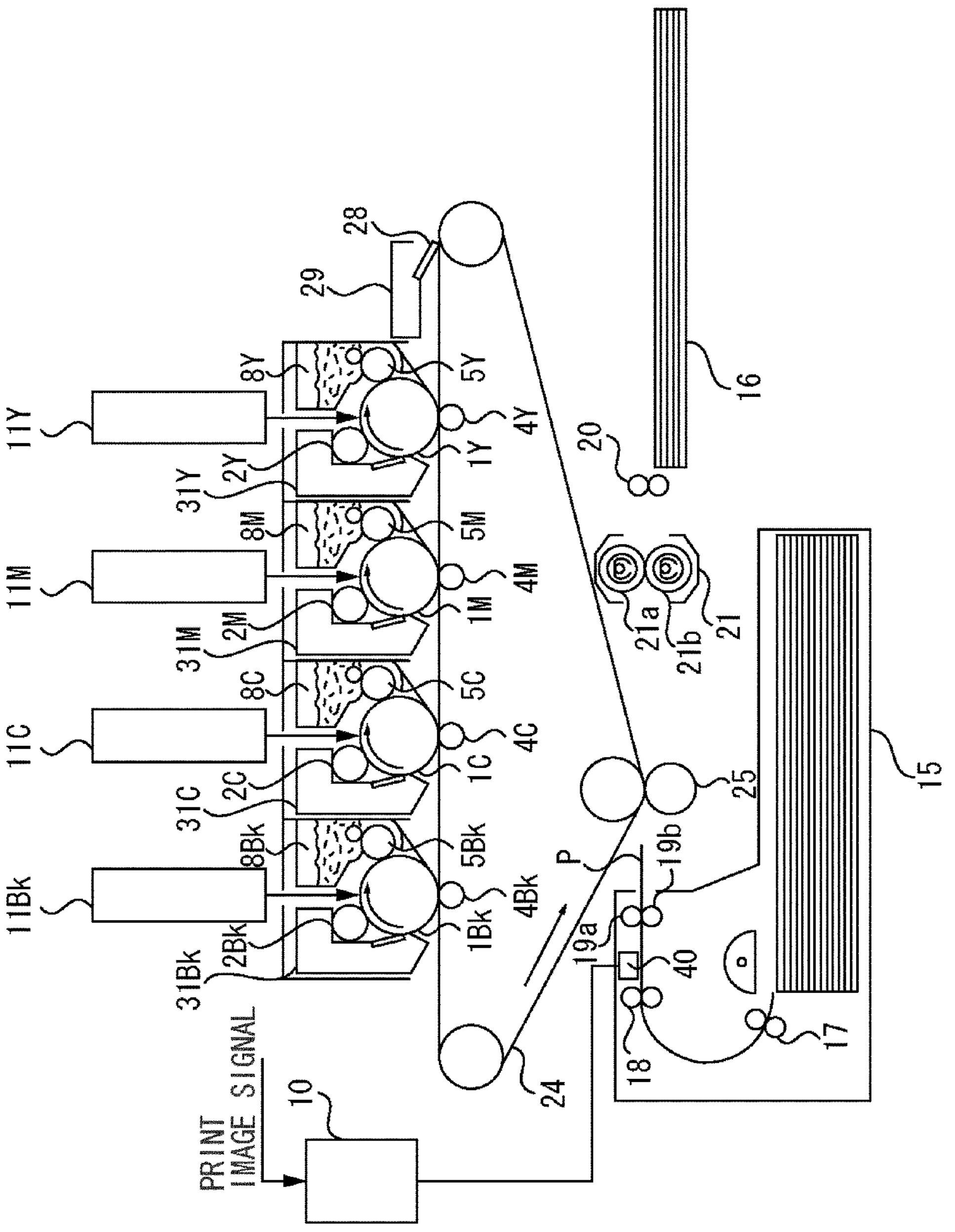
FIG. 1A is a sectional view of a color image forming apparatus according to a first exemplary embodiment.

The recording paper surface detection apparatus according to the first exemplary embodiment can be used, for example, in an electrophotographic color image forming apparatus. FIG. 1A is a sectional view illustrating an internal configuration of a tandem-type color image forming apparatus employing an intermediate transfer belt as an exemplary electrophotographic color image forming apparatus.

The color image forming apparatus illustrated in FIG. 1A is provided with four process cartridges 31 (31Y, 31M, 31C, and 31Bk) constituting first to fourth image forming units, respectively. The four image forming units respectively form yellow, magenta, cyan, and black images and have the same configuration except the toner color. Referring to FIG. 1A, symbols Y, M, C, and Bk denote members corresponding to the yellow, magenta, cyan, and black image forming units, respectively. However, in the descriptions below, when it is not particularly necessary to distinguish the color, symbols Y, M, C, and Bk are omitted.

Operations of an image forming unit of the image forming apparatus according to the present exemplary embodiment will be described below with reference to FIG. 1A. When a control unit 10 receives a print image signal, a feed roller pair 17 and a conveyance roller pair 18 send out a recording sheet P from a sheet cassette 15 to the image forming unit. Then, the recording sheet P is once stopped by a resist roller pair 19*a* and 19*b*, which is a conveying unit for synchronizing the image forming operation (described below) with the conveyance of the recording sheet P.

Meanwhile, the control unit 10 instructs an exposure scanner unit 11 to perform exposure according to the received image signal to form an electrostatic latent image on the surface of a photosensitive drum 1 which is a photosensitive member charged to a fixed potential by a charging roller 2. A driving force of a drive motor (not illustrated) is transmitted to the photosensitive drum 1 to rotate it clockwise in synchronization with the image forming operation.

A developer unit 8 is a unit for developing the electrostatic latent image to make it visible. The developer unit 8 is provided with a development sleeve 5 to which a developing bias is applied to make visible the electrostatic latent image. In this way, the electrostatic latent image formed on the surface of the photosensitive drum 1 is developed as a toner image by the action of the developer unit 8. The photosensitive drum 1, the charging roller 2, and the developer unit 8 are integrated into a process cartridge 31 that is detachably attached to the image forming apparatus.

An intermediate transfer belt 24 in contact with each of the photosensitive drums 1 rotates counterclockwise and synchronizes with the rotation of each of the photosensitive drums 1Y, 1M, 1C, and 1Bk at the time of color image forming. Color toner images developed on respective photosensitive drums are transferred onto the intermediate transfer belt 24 in succession and layered on top of one another by the action of a primary transfer bias applied to primary transfer rollers 4, thus producing a multi-color toner image on the intermediate transfer belt 24. Then, the multi-color toner image formed on the intermediate transfer belt 24 is conveyed to a secondary transfer nip portion including a secondary transfer roller pair 25. Meanwhile, the recording sheet P that has been stopped by the roller pair 19*a* and 19*b* is conveyed to the secondary transfer nip portion by the action of the resist roller pair 19*a* and 19*b* in synchronization with the multi-color toner image on the intermediate transfer belt 24. The multi-color toner image on the intermediate transfer belt 24 is collectively transferred onto the recording sheet P by the action of the secondary transfer bias applied to the secondary transfer roller pair 25.

A fixing unit 21 melts and fixes the transferred multi-color toner image onto the recording sheet P while conveying the recording sheet P. As illustrated in FIG. 1A, the fixing unit 21 is provided with a heating roller 21*a* for applying heat to the recording sheet P and a pressure roller 21*b* for applying pressure thereto to make it in contact with the heating roller 21*a*. While the heating roller 21*a* and the pressure roller 21*b* are conveying the recording sheet P holding the multi-color toner image, heat and pressure are applied to the recording sheet P so that the toner image is fixed onto the surface of the recording sheet P. After the toner image has been fixed, a discharge roller pair 20 discharges the recording sheet Pinto a discharge tray 16, thus completing image forming operation.

A cleaning unit 28 removes residual toner from the intermediate transfer belt 24 to clean the belt, and the removed residual toner is stored in a cleaner container 29 as waste toner.

The above-mentioned image forming operation is performed by the control unit 10 included in the image forming apparatus.

In the image forming apparatus in FIG. 1A, a recording paper surface detection apparatus 40 according to the present exemplary embodiment is disposed before the resist roller pair 19*a* and 19*b* (that is, on the upstream side in the recording sheet conveyance direction). The recording paper surface detection apparatus 40 can detect information about the surface unevenness (surface smoothness) of the recording sheet P conveyed from the sheet cassette 15. After the recording sheet P is sent out from the sheet cassette 15 to the image forming unit, the recording paper surface detection apparatus 40 detects surface conditions of the recording sheet P while it is being stopped by the resist roller pair 19*a* and 19*b* serving as a conveying unit.

Figure 1B:
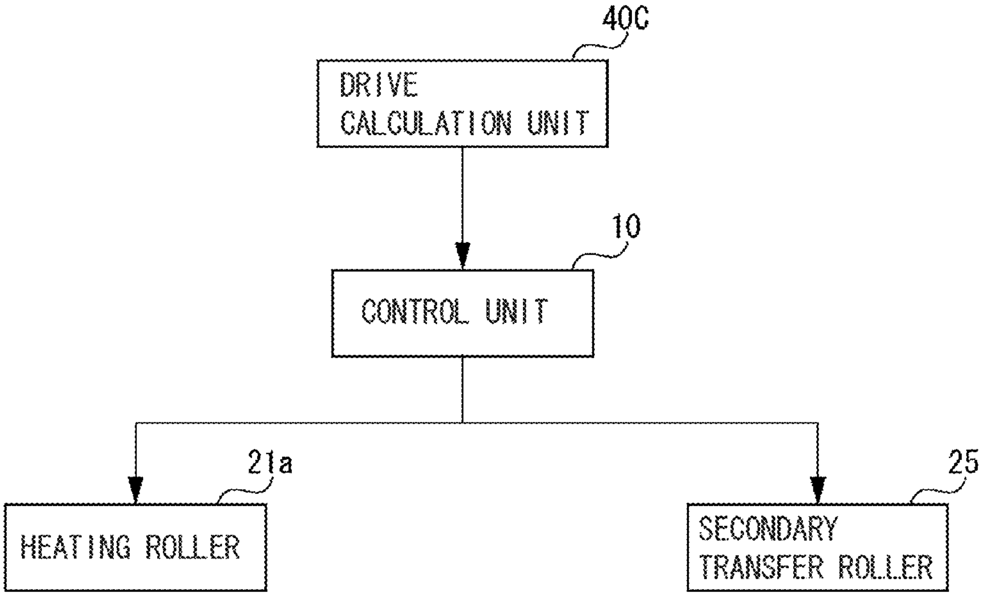
FIG. 1B is a block diagram illustrating operation control of the image forming apparatus according to the first exemplary embodiment.

FIG. 1B is a control block diagram illustrating operation control of the image forming apparatus. Based on detection information sent from a drive calculation unit 40C of the recording paper surface detection apparatus 40, the control unit 10 optimally controls image forming conditions for each image forming unit to operate the image forming apparatus. Specifically, the image forming conditions controlled by the control unit 10 include the secondary transfer bias of the secondary transfer roller pair 25 and the fixing temperature of the heating roller 21*a* included in the fixing unit 21.

Figure 2A:
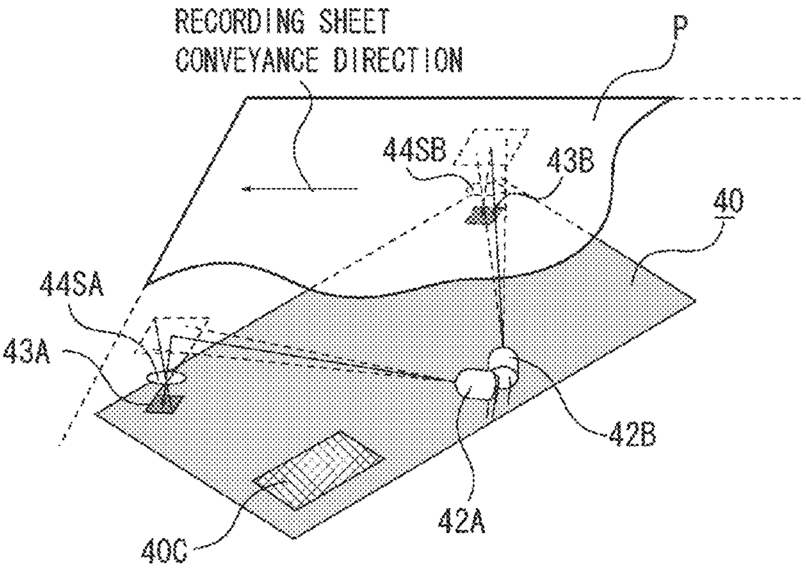
FIG. 2A is a perspective view of a recording paper surface detection apparatus according to the first exemplary embodiment.
Figure 2B:
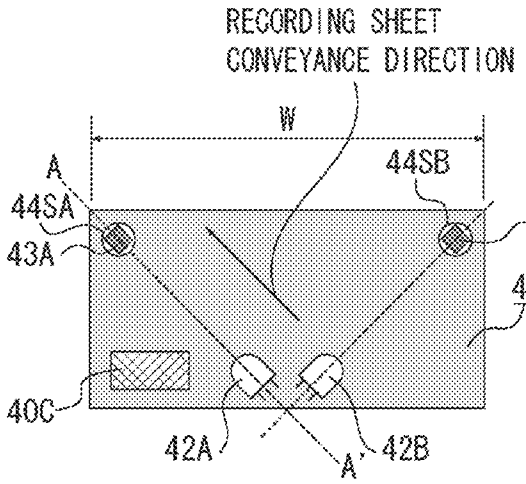
FIG. 2B is a top view of the recording paper surface detection apparatus according to the first exemplary embodiment.
Figure 2C:
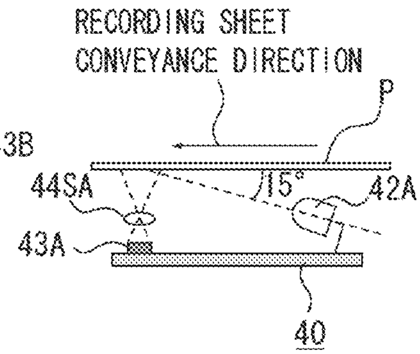
FIG. 2C is a sectional view of the recording paper surface detection apparatus according to the first exemplary embodiment.

The recording paper surface detection apparatus 40 according to the first exemplary embodiment will be described below. FIGS. 2A to 2C illustrate the overall configuration for capturing an image of the surface unevenness of the recording sheet P. FIG. 2A is a perspective view of the recording paper surface detection apparatus 40, FIG. 2B is a top view thereof, and FIG. 2C is a sectional view thereof taken along the A-A' line in FIG. 2B. The recording paper surface detection apparatus 40 according to the present exemplary embodiment includes illumination light emitting diodes (LEDs) 42A and 42B as light sources, CMOS area sensors 43A and 43B as image capture devices, and imaging lenses 44SA and 44SB as imaging methods. The recording paper surface detection apparatus 40 is provided to face the image forming surface of the recording sheet P. For convenience of description, the recording paper surface detection apparatus 40 in FIG. 1A is rotated by 180 degrees (upside down) in FIGS. 2A and 2C.

Illumination LEDs 42A and 42B each may be a diode such that light emitted at a p-n junction is proportional to the bias current and the light color is a function of the material used In one example, a white LED having high directivity (product No. NSPW300 DS from Nichia Corporation) is utilized for the illumination LEDs 42A and 42B used. As illustrated in FIGS. 2A and 2B, the illumination LED 42A is disposed as a first light source so that a straight line of the optical axis from the first light source projected on the recording sheet P coincides with the recording sheet conveyance direction. Further, the illumination LED 42B is disposed as a second light source so that a straight line of the optical axis from the second light source projected on the recording sheet P is perpendicular to the recording sheet conveyance direction. As illustrated in FIG. 2C, the two light beams from the two light sources are radiated onto the surface of the recording sheet P at an incidence angle of 15 degrees. Radiating light onto the surface of the recording paper at a small incidence angle in this way enables emphasizing the shadow produced by the surface unevenness on the recording sheet P. In order to emphasize the shadow produced by the surface unevenness on the recording sheet P, it is desirable to illuminate the paper surface with light at a small incidence angle from 0 (exclusive) to 20 (inclusive) degrees.

The recording sheet P is illuminated with light from a specific direction, and the shadow is produced by the surface unevenness thereon. The imaging lens 44SA and 44SB converge/focus/condense reflected light beams from areas in which shadow is produced by light illumination. The reflected light beams then are directed to the CMOS area sensors 43A and 43B, respectively. Each of the CMOS area sensor 43A as a first area sensor capture device and the CMOS area sensor 43B as a second area capture device capture an image of the respective areas of a predetermined size on the surface of the recording sheet P by using the respective reflected light beams. The reflected light beam reflects the surface unevenness (surface smoothness) in the respective areas on the surface of the recording sheet P in which the shadow is produced by light illumination. Each of the CMOS area sensors 43A and 43B detects an image voltage signal that changes according to the amount of reflected light for each pixel in the respective captured images of the areas, and outputs it to the drive calculation unit 40C. Upon reception of the image voltage signals from the CMOS area sensors 43A and 43B, the drive and operation unit 40C as a detector performs A/D conversion of the signals, calculates the contrast (lightness difference) from a 256-gradation digital signal (lightness information) after A/D conversion, and outputs the resultant contrast to the control unit 10. More specifically, the drive calculation unit 40C as a detector detects the contrast of a surface image captured by the CMOS area sensors 43 as image capture devices. The drive calculation unit 40C also drives and controls the light quantity and light emitting timing of the illumination LEDs 42. The CMOS area sensors 43 and the drive calculation unit 40C are included in the recording paper surface detection apparatus 40.

In the present exemplary embodiment, the CMOS area sensors 43A and 43B have an effective pixel size of 1.5 mm (vertical) by 1.5 mm (horizontal) and a resolution of 600 dpi. In combination with the imaging lens 44SA and 44SB, an area having a size of 3.0 mm (vertical) by 3.0 mm (horizontal) on the surface of the recording sheet can be captured with a resolution of 300 dpi. An area sensor refers to a sensor that can two-dimensionally capture information about a plurality of vertically arranged pixels and a plurality of horizontally arranged pixels at one time. As illustrated in FIGS. 2A to 2C, the CMOS area sensors 43A and 43B are disposed directly under areas (at positions along a direction approximately perpendicularly intersecting with the surface of the recording sheet P) illuminated with light from the illumination LEDs 42A and 42B. Specifically, after the reflected light beams from the light illuminated areas are condensed by the imaging lens 44SA and 44SB and then led to the CMOS area sensors 43A and 43B, respectively, the optical axis approximately perpendicularly intersects with the surface of the recording sheet P.

In the present exemplary embodiment, the recording sheet P is illuminated with light beams from two different directions from the fiber arrangement direction of the recording sheet P, and the CMOS area sensors 43A and 43B capture a surface image of respective light illuminated areas. In other words, a first optical axis of the light beam emitted from the first light source to illuminate a first light illuminated area and a second optical axis of the light beam emitted from the second light source to illuminate a second light illuminated area are such that straight lines including the first and second optical axes projected on the surface of the recording sheet P intersect with each other. Therefore, for example, even when the straight line of the optical axis from one light source projected on the recording sheet P coincides with the fiber arrangement direction and therefore a captured image shows low contrast in comparison with the surface unevenness, the straight line of the optical axis from the other light source projected on the recording sheet P is oriented in a different direction from the fiber arrangement direction and therefore a captured image shows high contrast reflecting the surface unevenness. Therefore, collectively taking these two images into consideration, for example, through averaging, it is possible to reduce variation in detection result caused by the relation between the fiber arrangement direction of the recording sheet P and the light illumination direction, thus improving the accuracy in determining the surface unevenness on the recording sheet P. The fiber arrangement direction of the recording sheet means an average direction of each of fibers on a recording sheet surface in the recording sheet.

Figure 3A:
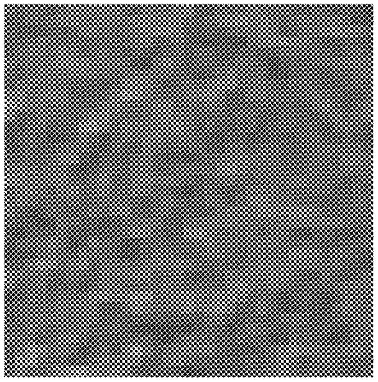
FIG. 3A illustrates a surface unevenness image of an area of paper type (1) illuminated with light from longitudinal direction of the paper.
Figure 3B:
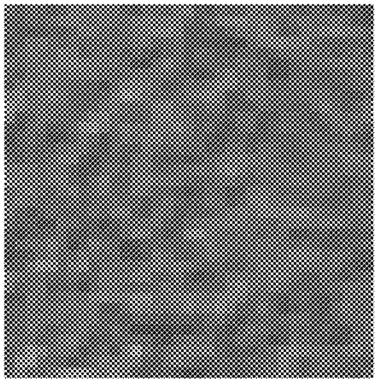
FIG. 3B illustrates a surface unevenness image of an area of paper type (1) illuminated with light from lateral direction of the paper.
Figure 4A:
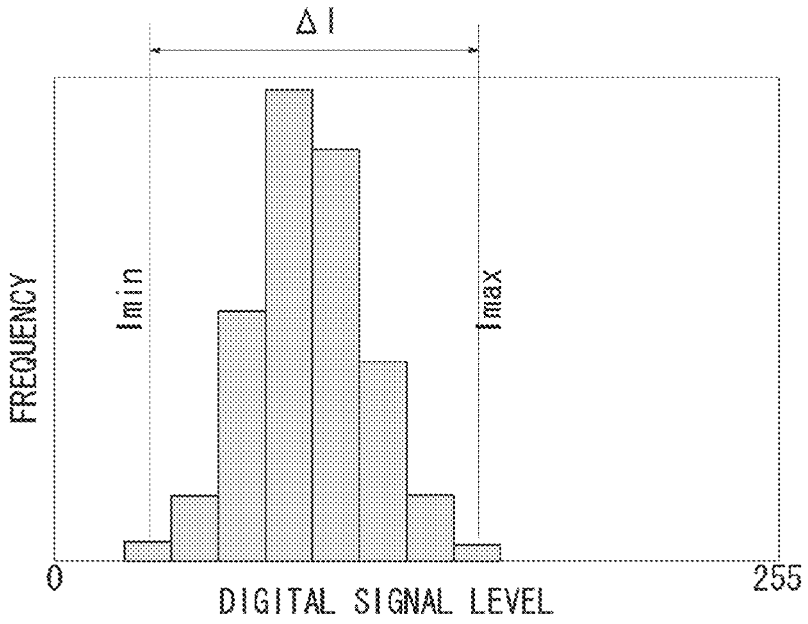
FIG. 4A is a histogram illustrating a lightness distribution of the surface unevenness image in FIG. 3A.
Figure 4B:
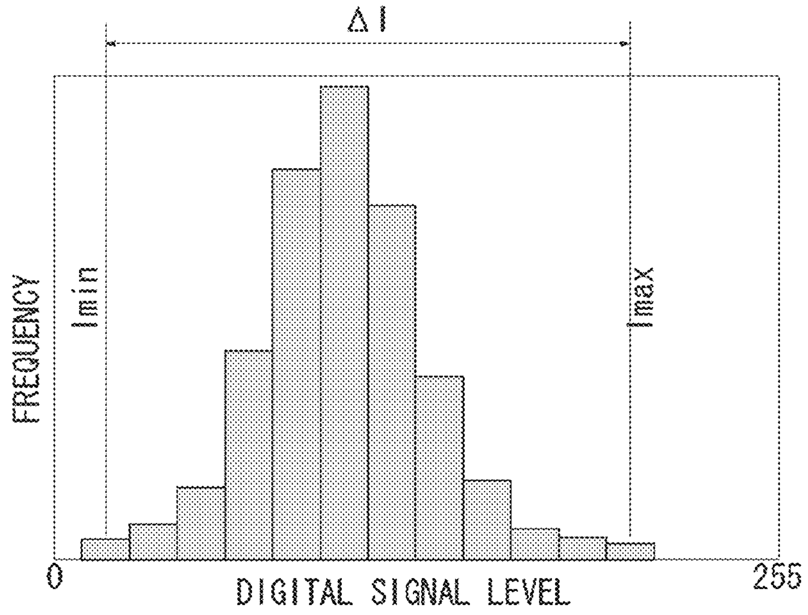
FIG. 4B is a histogram illustrating a lightness distribution of the surface unevenness image in FIG. 3B.

An exemplary experiment illustrating the effect of the above-mentioned configuration will be described below. In the experiment, two different paper types were used: paper type (1) of A4 size obtained by cutting Ledger-size plain paper (Xerox Business (registered trademark) 4200 20 Lb) in an oblique direction and paper type (2) of A4 size obtained by cutting the same plain paper along the fiber arrangement direction (longitudinal direction). Detection of paper types (1) and (2) will be described below. When A4 size paper type (1) is observed with a microscope, the fiber arrangement direction is inclined by 20 degrees with respect to the longitudinal direction of the paper. FIGS. 3A and 3B illustrate images of the surface of paper type (1) captured by using the recording paper surface detection apparatus according to the present exemplary embodiment. FIG. 3A illustrates a surface unevenness image of an area of a predetermined size on paper type (1) illuminated with light of the illumination LED 42A from the same direction as the longitudinal direction of the paper, captured by the CMOS area sensor 43A. FIG. 3B illustrates a surface unevenness image of an area of a predetermined size on paper type (1) illuminated with light of the illumination LED 42B from a direction perpendicular to the longitudinal direction (lateral direction) of the paper, captured by the CMOS area sensor 43B. FIGS. 4A and 4B illustrate lightness information (digital signal level) for these surface unevenness images in the form of histogram. Referring to FIGS. 4A and 4B, the horizontal axis is assigned the 256-gradation lightness information (digital signal level) for the surface unevenness image, and the vertical axis is assigned the number of pixels in the capture area represented as the frequency.

Figure 5:
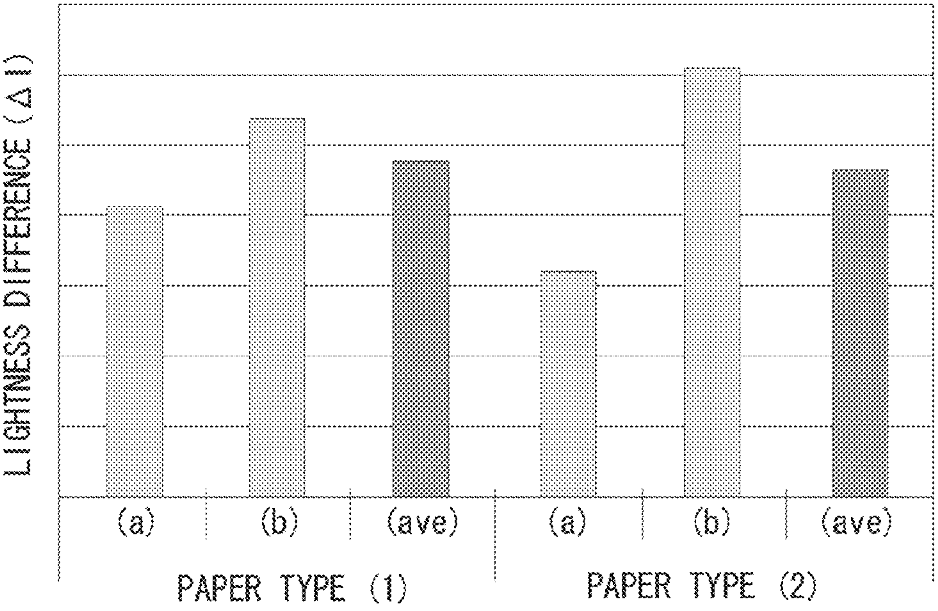
FIG. 5 is a graph illustrating a result of lightness difference detection for paper types (1) and (2) in the first exemplary embodiment.

The drive calculation unit 40C calculates an average value Imax of signals from five pixels having the first to fifth highest lightness (highest voltage) information (digital signal level). The drive calculation unit 40C also calculates an average value Imin of signals from five pixels having the first to fifth lowest lightness (lowest voltage) information. The drive calculation unit 40C obtains a lightness difference ΔI, which is a difference between Imax and Imin for each image. FIG. 5 illustrates a result of lightness difference detection for above-mentioned A4 size paper types (1) and (2). For example, the image of the light illuminated area on paper type (1) illuminated with light from a direction perpendicular to the longitudinal direction (lateral direction) of the paper reveals distinct shadow, providing a large lightness difference ΔI (1)B. On the contrary, the image of the area on paper type (1) illuminated with light from the same direction as the longitudinal direction of the paper reveals indistinct shadow, providing a small lightness difference ΔI (1)A. The drive calculation unit 40C obtains ΔI (1)A and ΔI (1)B, and calculates an average lightness difference ΔI (1) (ave) thereof. Likewise, the drive calculation unit 40C calculates an average lightness difference ΔI (2) (ave) from ΔI (2)A and ΔI (2)B for paper type (2). As illustrated in FIG. 5, A4 size paper type (2) in which the fiber arrangement direction coincides with the longitudinal direction of the paper provides a large difference between ΔI (2)A and ΔI (2)B. On the contrary, paper type (1) with which the fiber arrangement direction is inclined by 20 degrees with respect to the longitudinal direction of the paper provides a small difference between ΔI (1)A and ΔI (1)B. This means that the lightness difference in each surface unevenness image depends on the fiber arrangement direction of the paper. On the other hand, the average lightness difference ΔI (ave) for each of paper types (1) and (2) converges to almost the same value. This means that the dependency of the detection result on the fiber arrangement direction can be reduced by capturing images of the two light illuminated areas illuminated with light from the two different light sources.

Figure 16:
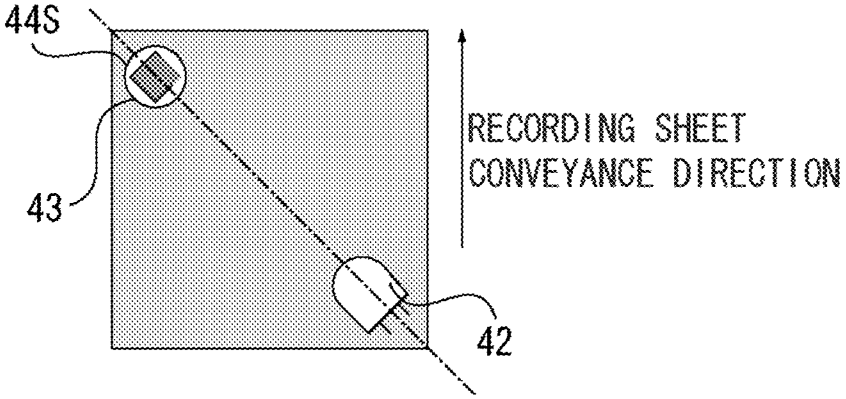
FIG. 16 is a top view of a recording paper surface detection apparatus as a comparative form of the first exemplary embodiment.

As a comparative form of the present exemplary embodiment, a recording paper surface detection apparatus of the well-known conventional type (based on one light source and one captured image) was produced on an experimental basis. Then, paper surface detection was performed by using the above-mentioned two A4 size paper types (1) and (2), as illustrated in FIG. 16. Description of this comparative form will be omitted since it is configured in the same way as the present exemplary embodiment except that the illumination LED 42 is disposed so that a straight line for the optical axis therefrom projected on the recording sheet (paper) P is inclined by 45 degrees with respect to the recording sheet conveyance direction.

Figure 17:
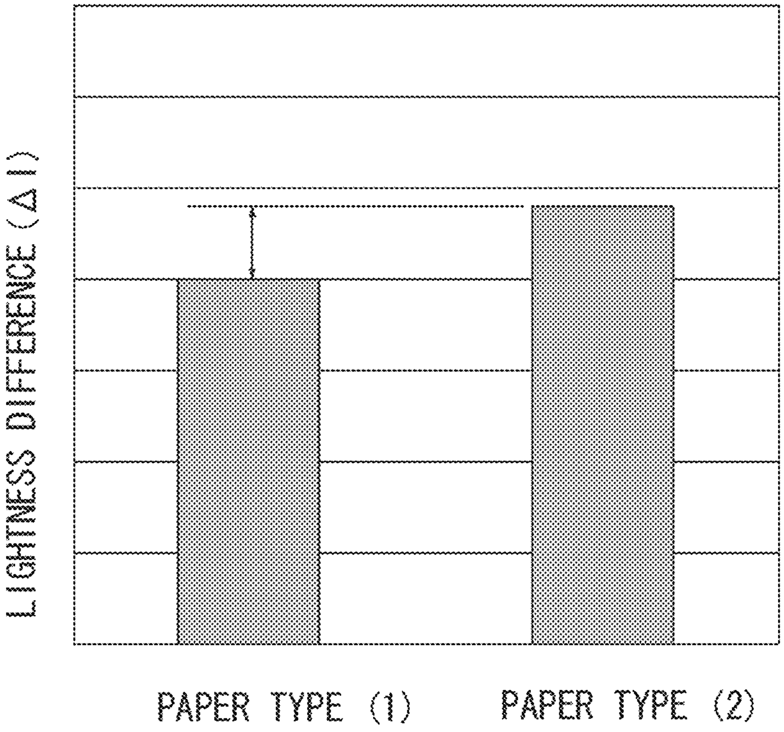
FIG. 17 is a graph illustrating a result of lightness difference detection of paper types (1) and (2) in the comparative form of the first exemplary embodiment.

FIG. 17 illustrates a result of paper surface detection obtained by using this recording paper surface detection apparatus. Paper surface detection for paper type (1) in which the fiber arrangement direction is inclined by 20 degrees with respect to the longitudinal direction of A4 size paper provides a much smaller lightness difference ΔI than paper surface detection for paper type (2) in which the fiber arrangement direction coincides with the longitudinal direction of A4 size paper. More specifically, the comparative form provides largely different results of paper surface detection depending on the fiber arrangement direction of the paper although the same paper type is used.

On the contrary, the present exemplary embodiment enables reducing the dependency of the detection result on the fiber arrangement direction of the recording sheet and accordingly decrease variation in detection result, thus improving the surface unevenness determination accuracy.

Further, in the present exemplary embodiment, the first optical axis from the illumination LED 42A is perpendicular to the second optical axis from the illumination LED 42B. With this configuration, when a captured image of one light illuminated area shows a low lightness difference (contrast), a captured image of the other light illuminated area shows a high lightness difference (contrast) without exception. Thus, in recording sheets having any fiber arrangement direction, variation in detection result caused by the fiber arrangement direction of the recording sheet can be most effectively reduced by using the average lightness difference ΔI (ave) which is an average value of the lightness differences (contrasts) for two captured images. However, it is not necessary that the first optical axis is perpendicular to the second optical axis. This can be understood from the comparison with the conventional well-known configuration (based on one captured image of one area illuminated with light of one light source from one direction). Thus, variation in detection result can be reduced and hence the surface unevenness determination accuracy can be improved by using the average lightness difference ΔI (ave) for two captured images of the two areas having different shadow conditions illuminated with light from the two different directions. Therefore, it is preferable to arrange the first and second light sources such that a straight line connecting the first light source and the first light illuminated area projected on the recording sheet P intersects with a straight line connecting the second light source and the second light illuminated area projected on the recording sheet P.

With the above-mentioned configuration, the determination is made using the average lightness difference ΔI (ave) for two captured images. However, a determination method is not limited to that method. As another method, for example, the determination may be made using lightness difference in which two lightness differences are combined, that is, ΔI (1)(a) is added to ΔI (1)(b). Alternatively, a combination ratio of two lightness differences may be varied according to a difference of the two lightness differences, ΔI (1)(a) and ΔI (1)(b). Furthermore, the determination may be made using either of captured images, for example, using a captured image of a larger lightness difference. Also in this method, the possibility is reduced that a different determination result is obtained as to the same recording sheet, compared with the method in which only one area irradiated with light from one direction is imaged.

With the above-mentioned configuration, although the first and second light illuminated areas are disposed as separate areas having no overlapped portion on the surface of the recording sheet P, these two areas may be disposed so that they are partially overlapped with each other. In this case, when an image of one area illuminated with one light source is captured, the other light source does not emit light. In other words, the light emitting timing is differentiated between the illumination LEDs 42A and 42B. Accordingly, the timing of image capturing is also differentiated between the first and second light illuminated areas, that is, image capturing is performed for one area at a time. Description of the two captured images will be omitted since they are processed in the same way as above.

Figure 6:
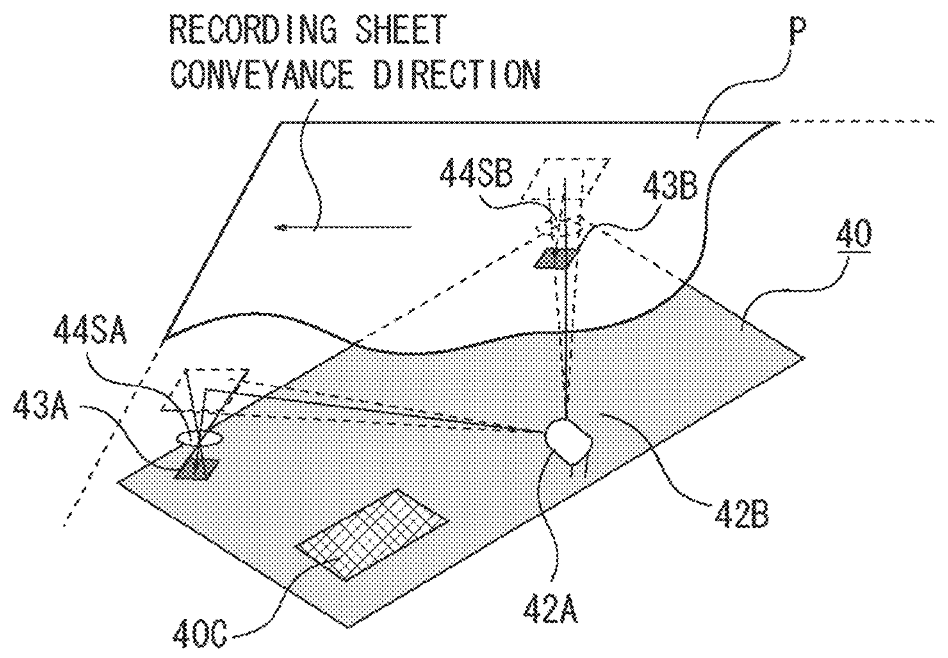
FIG. 6 is a perspective view of a recording paper surface detection apparatus according to a modification of the first exemplary embodiment.

Further, although two illumination LEDs 42A and 42B are used as the first and second light sources, respectively, an illumination LED 42 may be used instead of the two illumination LEDs 42A and 42B, as illustrated in FIG. 6. In this case, the illumination LED 42 may emit light beams in two different directions to illuminate the first and second light illuminated areas.

Although a LED is used as a light source in the present exemplary embodiment, a xenon lamp or halogen lamp, for example, can also be used as a light source. In short, a necessary requirement for the light source is only the ability to radiate sufficient light quantity to emphasize the shadow produced by the surface unevenness on the recording sheet. Further, instead of the area sensor, a line sensor having pixels arranged in a direction perpendicular to the recording sheet conveyance direction may be used as an image capture device. An image may be captured while moving the line sensor in the recording sheet conveyance direction. Further, a CCD type sensor may be used instead of the CMOS type sensor. In short, a necessary requirement for the image capture device is only the ability to capture an image of the surface unevenness on the recording sheet.

Although the detection function for detecting the contrast of the surface image captured by the CMOS area sensors 43 is included in the drive calculation unit 40C of the recording paper surface detection apparatus 40 in the present exemplary embodiment, the function may be included in the control unit 10 of the image forming apparatus. In the present exemplary embodiment, the control unit 10 controls the transfer bias or fixing temperature based on the result of recording sheet surface unevenness detection by the recording paper surface detection apparatus 40. However, control factors are not limited thereto but it may be possible for the control unit 10 to control, for example, various control parameters in each process such as latent image formation and development as well as a series of image forming speed (process speed). In short, the control parts 10 may control any image forming conditions related to the image forming unit for forming an image on the recording sheet in the image forming apparatus.

The first exemplary embodiment has specifically been described based on LED arrangements such that light beams from the illumination LEDs 42A and 42B are delivered in the inverted V shape when viewed from the downstream side of the recording sheet conveyance direction. A second exemplary embodiment will be described based on modified LED arrangements for the recording paper surface detection apparatus 40. In the present exemplary embodiment, elements equivalent to those in the first exemplary embodiment are assigned the same reference numeral and duplicated descriptions will be omitted, and therefore only the LED arrangements will be described below.

Figure 7A:
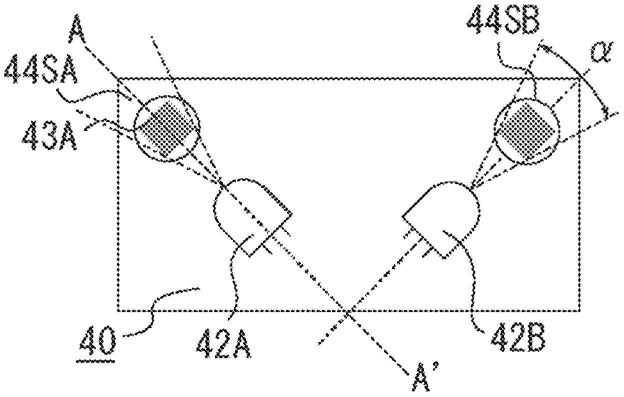
FIG. 7A is a top view illustrating constraint condition with the recording paper surface detection apparatus.
Figure 7B:
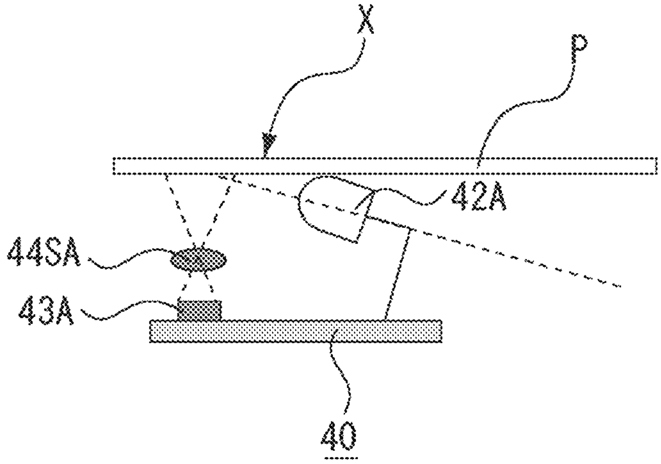
FIG. 7B is a sectional view illustrating a constraint condition with the recording paper surface detection apparatus.

FIGS. 7A and 7B illustrate a modified version of the recording paper surface detection apparatus 40 according to the first exemplary embodiment in FIG. 2. The illumination LEDs 42A and 42B are brought closer to the area sensors 43A and 43B and imaging lenses 44SA and 44SB. FIG. 7A is a top view and FIG. 7B is a sectional view taken along the A-A' line in FIG. 7A. Referring to FIGS. 2B and 7A, each of the light beam emitted from the illumination LEDs 42A and 42B in FIG. 7A to illuminate the light illuminated area has a larger beam spread angle (α) than that in FIG. 2B. When the beam spreads too largely in this way, one light illuminated area contains both high- and low-contrast portions, which increases the complexity of determination algorithm, or reduces the surface unevenness determination accuracy. Accordingly, it is necessary to separate the illumination LEDs 42A and 42B to some extent from the area sensors 43A and 43B and the imaging lens 44SA and 44SB, respectively. As illustrated in FIG. 7B, in a direction normal to the recording sheet P, the illumination LEDs 42A and 42B may interfere the conveyance path of the recording sheet P (at around a portion X). This is another reason why it is necessary to separate the illumination LEDs 42A and 42B to some extent from the area sensors 43A and 43B and the imaging lens 44SA and 44SB (constraint condition).

Figure 8:
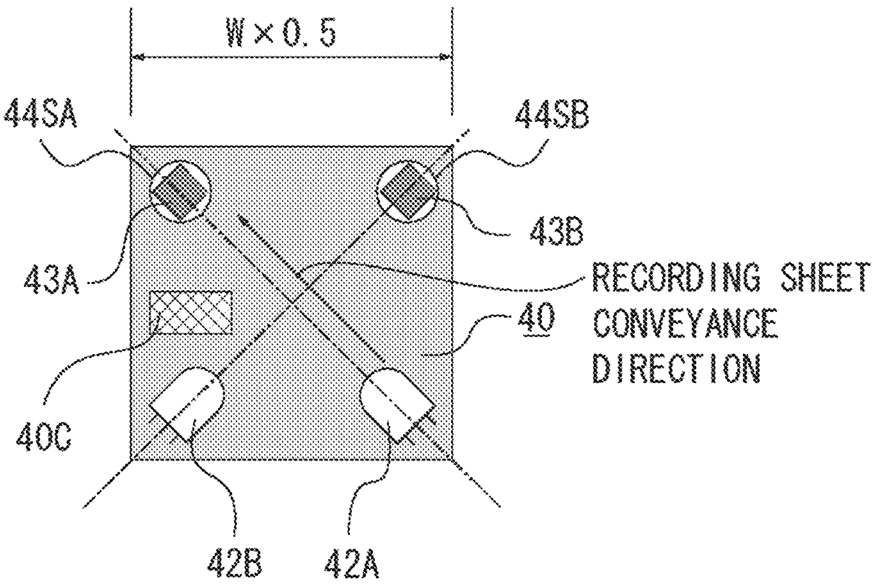
FIG. 8 is a top view of a recording paper surface detection apparatus according to a second exemplary embodiment.

In the present exemplary embodiment, LED arrangements for miniaturizing the recording sheet surface detection apparatus will be described below taking such a constraint condition into consideration. FIG. 8 is a top view of the recording paper surface detection apparatus 40 according to the present exemplary embodiment. The two illumination LEDs 42A and 42B are preferably disposed so that respective light beams intersect with each other. In other words, the optical axis of the light beam emitted from the illumination LED 42A to illuminate the first light illuminated area and the optical axis of the light beam emitted from the illumination LED 42B to illuminate the second light illuminated area have a relation such that straight lines of these optical axes projected on the surface of the recording sheet P intersect with each other. These LED arrangements make it possible to compactly arrange, in optical paths at least from the light source to the light illuminated area, necessary members for forming the optical paths. Therefore, it is possible to reduce a projection area of the illumination LEDs 42A and 42B and the first and second light illuminated areas on the surface of the recording sheet P, enabling the miniaturization of the recording paper surface detection apparatus.

The optical paths from the light illuminated areas to the CMOS sensors 43A and 43B will be described below. When the CMOS sensors 43A and 43B are projected on the surface of the recording sheet P, each center of the illumination LED 42A, the illumination LED 42B, the first light illuminated area, and the second light illuminated area is projected on the surface of the recording sheet P such that the CMOS sensors are preferably positioned within a quadrangular area formed by connecting these four points. The CMOS sensors 43A and 43B arranged in this way make it possible to fit the optical paths from the light illuminated areas to the CMOS sensors 43A and 43B into a range occupied by the optical paths from the light sources to respective light illuminated areas when viewed from a direction normal to the recording sheet P. In other words, the projection area of the recording sheet surface detection apparatus on the surface of the recording sheet P can be reduced by overlapping the optical paths from the illumination LEDs 42A and 42B to respective light illuminated areas with the optical paths from the light illuminated areas to the CMOS sensors 43A and 43B when viewed from a direction normal to the recording sheet P. As a result, the entire recording paper surface detection apparatus can be further miniaturized. In the present exemplary embodiment, the CMOS sensors 43A and 43B are disposed at a position shifted from respective light illuminated areas toward a direction approximately perpendicular to the surface of the recording sheet, similarly to the first exemplary embodiment. Therefore, the optical paths from the illumination LEDs 42A and 42B to respective light illuminated areas, the optical paths from the light illuminated areas to the CMOS sensors 43A and 43B, and necessary members for forming these optical paths satisfy the above-mentioned conditions. The recording paper surface detection apparatus in FIG. 8 having the illumination LEDs 42A and 42B, the first and second light illuminated areas, and the CMOS sensors 43A and 43B arranged under the above-mentioned conditions enable reducing width to about 50% in comparison with that in FIG. 2 (from W to W×0.5).

In the present exemplary embodiment, images of two areas illuminated with light of two light sources from two different directions are captured similarly to the first exemplary embodiment. This configuration enables reducing the dependency of the detection result on the fiber arrangement direction of the recording sheet and accordingly decreases variation in detection result, thus improving the surface unevenness determination accuracy. Further, the present exemplary embodiment can miniaturize the recording paper surface detection apparatus.

Figure 9A:
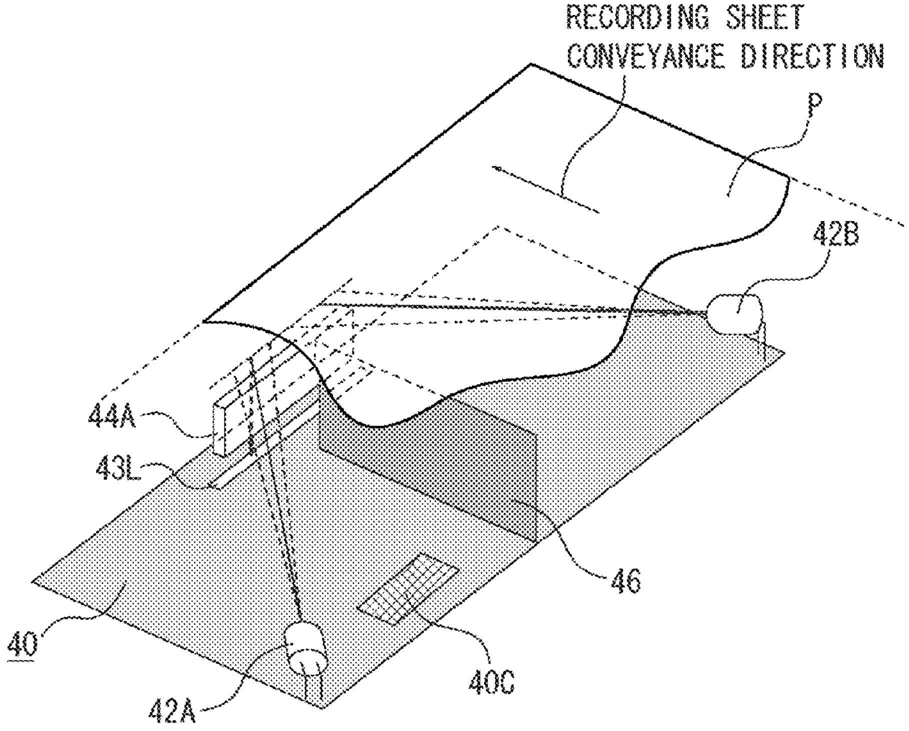
FIG. 9A is a perspective view of a recording paper surface detection apparatus according to a third exemplary embodiment.
Figure 9B:
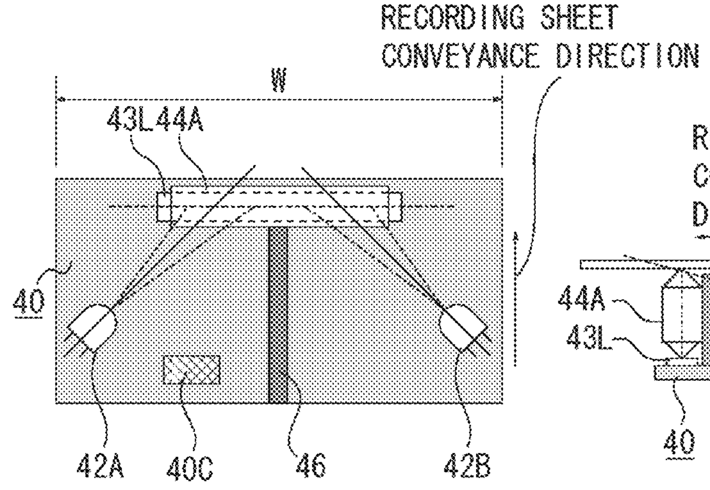
FIG. 9B is a top view of the recording paper surface detection apparatus according to the third exemplary embodiment.
Figure 9C:
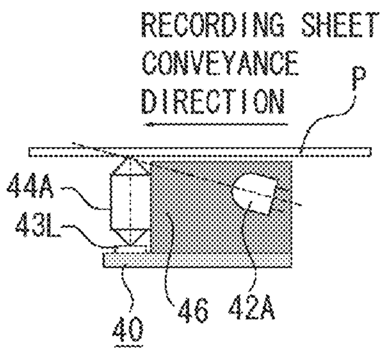
FIG. 9C is a side view of the recording paper surface detection apparatus according to the third exemplary embodiment.

FIG. 9A is a perspective view of a recording paper surface detection apparatus according to a third exemplary embodiment, FIG. 9B is a top view thereof, and FIG. 9C is aside view thereof. The recording paper surface detection apparatus 40 according to the third exemplary embodiment includes the illumination LEDs 42A and 42B as light sources, a light blocking plate 46 as a light shielding method, a CMOS line sensor 43L as an image capture device, and an imaging lens array 44A as an imaging method. Descriptions of elements equivalent to those in the first exemplary embodiment will be omitted.

In the present exemplary embodiment, a standard lamp type white LED (model number SLR343WBC7T from ROHM Co., Ltd.) is used for the illumination LEDs 42A and 42B as light sources. As illustrated in FIGS. 9A and 9B, the illumination LED 42A is disposed as the first light source so that a straight line of the optical axis from the first light source projected on the recording sheet P is inclined by +45 degrees with respect to the recording sheet conveyance direction, and the illumination LED 42B is disposed as the second light source so that a straight line of the optical axis from the second light source projected on the recording sheet P is inclined by −45 degrees with respect to the recording sheet conveyance direction, on the premise that the clockwise direction is the positive direction. This means that the optical axes from the two light sources are arranged in the inverted V shape when viewed from the downstream side of the recording sheet conveyance direction. As illustrated in FIG. 9C, the light beams from the two light sources illuminate two areas on the same straight line perpendicularly intersecting with the recording sheet conveyance direction at 15 degrees with respect to the surface of the recording sheet P. The CMOS line sensor 43L and the imaging lens array 44A are disposed so that their respective longitudinal directions perpendicularly intersect with the recording sheet conveyance direction. This configuration enables image capturing of the two light illuminated areas (first and second light illuminated areas) on the straight line perpendicularly intersecting with the recording sheet conveyance direction illuminated with the illumination LEDs 42A and 42B. The first and second light illuminated areas are different areas such as by being completely separate and detached from each other, by having different shapes, or by having different amounts of surface enclosed within a boundary.

The shielding plate 46 is a plate-like member provided in parallel with the recording sheet conveyance direction. The shielding plate 46 is intended to prevent the light of the illumination LED 42B from illuminating the first light illuminated area that is to be illuminated with the light of the illumination LED 42A, and the light of the illumination LED 42A from illuminating the second light illuminated area that is to be illuminated with the light of the illumination LED 42B. Further, the light blocking plate 46 is made of a black-colored member to prevent diffuse reflection on its surface when illuminated with the light from the two illumination LEDs. Further, the surface of the light blocking plate 46 is desirably matte-finished to prevent regular reflection on its surface.

Reflected light beams from the areas including shadow information reflecting the surface unevenness (surface smoothness) on the recording sheet P are condensed by the imaging lens array 44A and then captured by the CMOS line sensor 43L as line images. The CMOS line sensor 43L detects an image voltage signal, which changes according to the amount of reflected light for each line of pixels in the captured line image, and outputs it to the drive calculation unit 40C. Upon reception of the image voltage signal from the CMOS line sensor 43L, the drive and operation unit 40C serving as a detector performs A/D conversion of the signal to detect digital signals (lightness information) after A/D conversion. During image capturing operation for each line of pixels while moving the recording sheet P in the recording sheet conveyance direction, digital signals (lightness information) are connected in succession to generate areal lightness information. The drive calculation unit 40C calculates contrast (lightness difference) from the areal digital signals (lightness information) and outputs it to the control unit 10. In other words, the drive calculation unit 40C as a detector detects contrast calculated from the areal lightness information generated by connecting in succession line images captured by the CMOS line sensor 43L serving as an image capture device. The CMOS line sensor 43L and the drive calculation unit 40C are included in the recording paper surface detection apparatus 40.

The CMOS line sensor 43L used for the present exemplary embodiment has an effective pixel length (longitudinal direction) of 20 mm and a resolution of 600 dpi. While the recording sheet P is being conveyed to the secondary transfer nip portion by the resist roller pair 19*a* and 19*b* as a conveying unit, the control unit 10 performs the above-mentioned image capturing operation for each line of pixels by moving the recording sheet P in the recording sheet conveyance direction by 5 mm. More specifically, the CMOS line sensor 43L captures an image of a line connecting pixels of a predetermined size in the first light illuminated area on the surface of the recording sheet P and pixels of a predetermined size in the second light illuminated area thereon as a line image. The CMOS line sensor 43L captures images of the surface of the recording sheet P in succession while the resist roller pair 19*a* and 19*b* is conveying the recording sheet P as a conveying unit, thus obtaining lightness information of a 5×20 mm square area on the surface of the recording paper with a resolution of 600×600 dpi. The line sensor refers to a sensor that can capture line information of one vertically arranged pixel and a plurality of horizontally arranged pixels. It is also possible to arrange a plurality of this type of line sensors vertically and horizontally to capture information about a plurality of lines at the same time. Using the line sensor in this way enables image capturing of the surface of the recording sheet P while conveying the recording sheet P. Therefore, in comparison with image capturing while the recording sheet P is stopped, surface conditions of the recording sheet can be detected without degrading the throughput of the image forming apparatus.

Figure 10A:
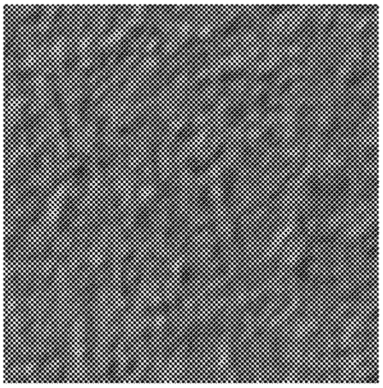
FIG. 10A illustrates a surface unevenness image of an area of paper type (1) illuminated with light from longitudinal direction of the paper.
Figure 10B:
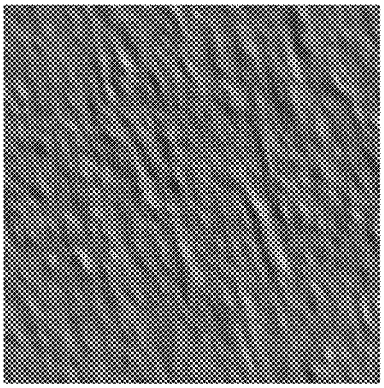
FIG. 10B illustrates a surface unevenness image of an area of paper type (1) illuminated with light from lateral direction of the paper.

Of areal images obtained by performing image capturing operation for each line of pixels in succession, one 5×10 mm half area is a shadow image produced by the illumination with the light from the illumination LED 42A and the other 5×10 mm half area is a shadow image produced by the illumination with the light from the illumination LED 42B. The drive calculation unit 40C extracts a 5×5 mm area around the center of each of the two half-area images obtained by the illumination with the light from the illumination LEDs 42A and 42B. For example, FIG. 10A and FIG. 10B illustrate two surface images obtained through a surface detection technique for A4 size paper type (1) similar to the technique according to the first exemplary embodiment. The drive calculation unit 40C detects the surface unevenness on the recording sheet P through an analysis technique similar to the technique according to the first exemplary embodiment. The control unit 10 controls image forming conditions of the image forming unit, such as optimal transfer bias and fixing temperature, based on the detection result.

As mentioned above, in the present exemplary embodiment, images of two areas illuminated with light of two light sources from two different directions are captured similarly to the first exemplary embodiment. This configuration enables reducing the dependency of the detection result on the fiber arrangement direction of the recording sheet and accordingly decreases variation in detection result, thus improving the surface unevenness determination accuracy.

Further, in the present exemplary embodiment, the light blocking plate 46 is provided to prevent the light from one direction from illuminating the first and second light illuminated areas to be illuminated with the light from the other direction, thus preventing the reduction in surface unevenness determination accuracy.

Figure 11:
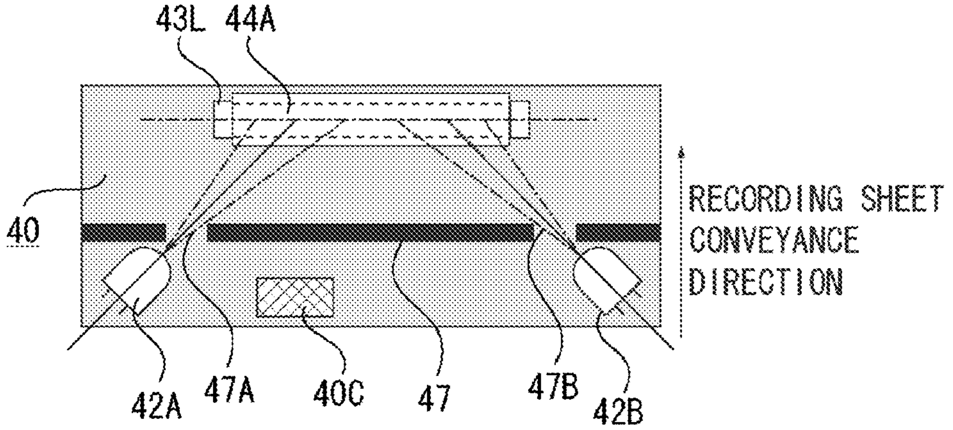
FIG. 11 is a top view of a recording paper surface detection apparatus according to a first modification of the third exemplary embodiment.

In the present exemplary embodiment, although the light blocking plate 46 disposed in parallel with the recording sheet conveyance direction is used as a light shielding method, the light shielding method is not limited thereto. For example, as a first modification of the present exemplary embodiment, a light blocking plate 47 including slits may be disposed in non-parallel with the recording sheet conveyance direction for use as a light shielding method, as illustrated in FIG. 11. The shielding plate 47 includes a first slit 47A provided in the first optical path along which the light travels from the illumination LED 42A to the first light illuminated area, and a second slit 47B provided in the second optical path along which the light travels from the illumination LED 42B to the second light illuminated area. Each slit may be a narrow opening through light blocking plate 47. The use of the light blocking plate 47 including such slits reduces the constraint on the directivity of the illumination LEDs. This makes it easier to adjust the optical axes from the illumination LEDs (light sources), advantageously extending the range of selection of light sources.

Figure 12:
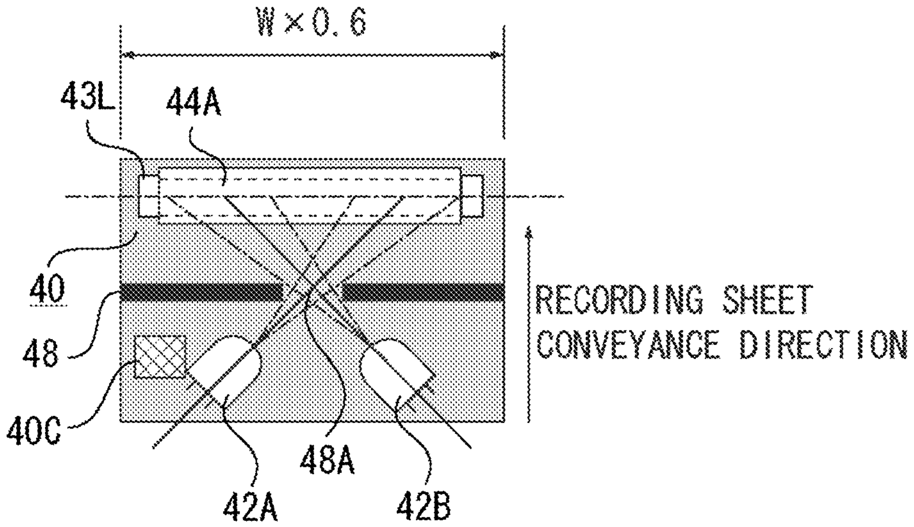
FIG. 12 is a top view of a recording paper surface detection apparatus according to a second modification of the third exemplary embodiment.

As a modification of the first exemplary embodiment, a light blocking plate including slits may also be used for the recording paper surface detection apparatus having optical axes from the two illumination LEDs intersecting with each other, as illustrated in FIG. 8. FIG. 12 illustrates a recording paper surface detection apparatus according to a second modification of the third exemplary embodiment. In this case, the recording paper surface detection apparatus is provided with a light blocking plate 48 including a slit 48A at a position where the first and second optical paths intersect with each other. This configuration enables the miniaturization of the recording paper surface detection apparatus by intersecting the optical axes from the two illumination LEDs with each other similarly to the modification of the first exemplary embodiment illustrated in FIG. 8. The recording sheet surface detection apparatus in FIG. 12 enables reducing width by about 40% in comparison with that in FIG. 11. Further, with this configuration, the optical paths from the two different directions can be blocked simply by providing the slit 48A on the light blocking plate 48, reducing the cost for providing a slit and for processing its edges with sufficient accuracy.

Figure 18:
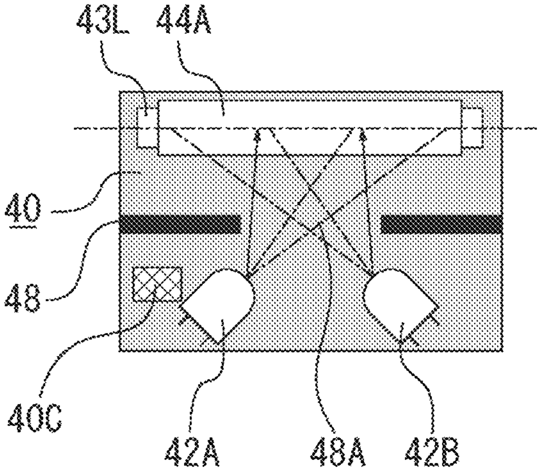
FIG. 18 is a top view illustrating a problem with the recording paper surface detection apparatus.
Figure 19:
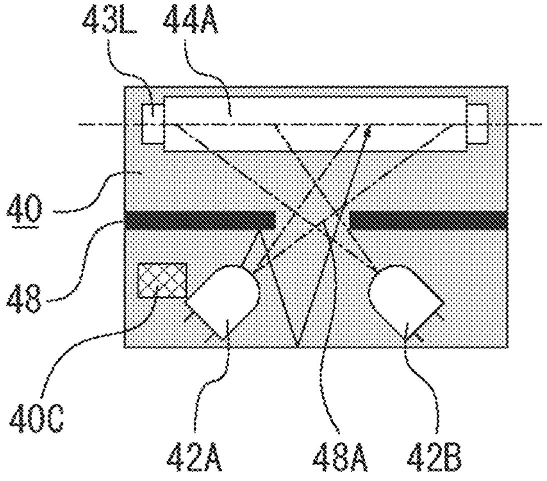
FIG. 19 is a top view illustrating the problem with the recording paper surface detection apparatus.

However, with the configuration according to the second modification of the present exemplary embodiment, the light from the illumination LED 42A may directly illuminate the second light illuminated area and the light from the illumination LED 42B may directly illuminate the first light illuminated area, as illustrated in FIG. 18. To prevent this, it is necessary to make some arrangements for the layout of the illumination LEDs 42A and 42B as well as the layout of the light blocking plate 48 including the slit 48A. Further, as illustrated in FIG. 19, the light from the illumination LEDs 42A and 42B may cause multiplex reflection on the light blocking plate 48 or the wall surface of the recording paper surface detection apparatus 40 before passing the slit, reducing the contrast of the shadow image obtained.

Figure 13:
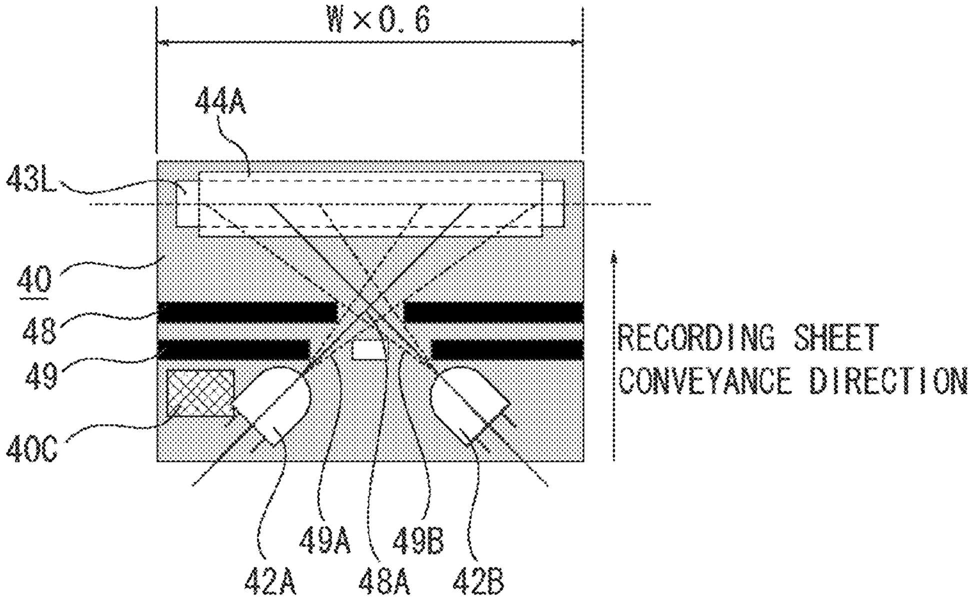
FIG. 13 is a top view of a recording paper surface detection apparatus according to a third modification of the third exemplary embodiment.

A recording paper surface detection apparatus having two shielding plates as a method for preventing these phenomena is illustrated in FIG. 13. In addition to the light blocking plate 48 illustrated in FIG. 12, a recording paper surface detection apparatus 40 illustrated in FIG. 13 is provided with a second shielding plate 49 between the illumination LEDs 42 and the light blocking plate 48. The second shielding plate 49 includes a first slit 49A provided in the first optical path along which the light travels from the illumination LED 42A to the first light illuminated area, and a second slit 49B provided in the second optical path along which the light travels from the illumination LED 42B to the second light illuminated area. This configuration makes it possible to prevent the light from one direction from illuminating the first and second light illuminated areas to be illuminated with the light from the other direction, thus preventing the reduction in surface unevenness determination accuracy.

Figure 14A:
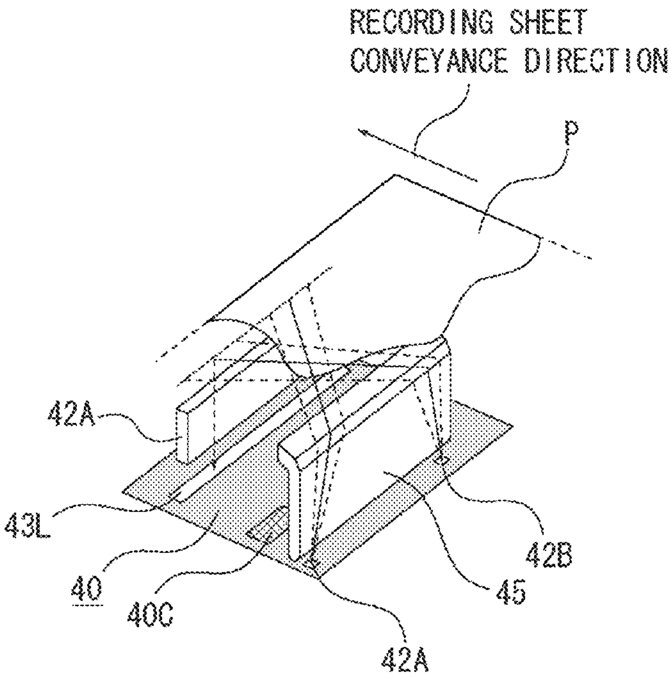
FIG. 14A is a perspective view of a recording paper surface detection apparatus according to a fourth exemplary embodiment.
Figure 14B:
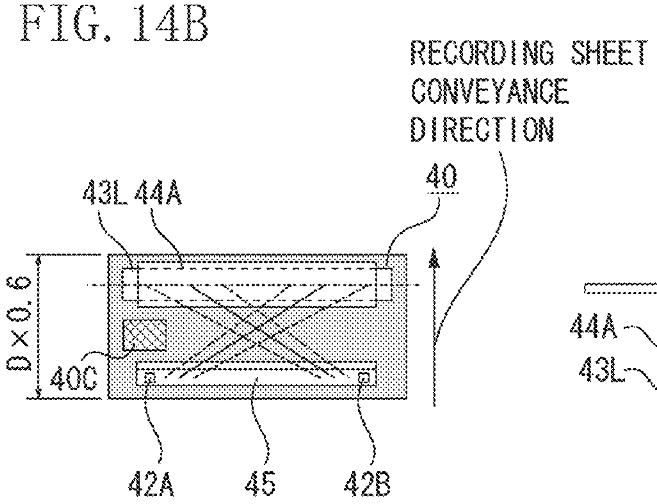
FIG. 14B is a top view of the recording paper surface detection apparatus according to the fourth exemplary embodiment.
Figure 14C:
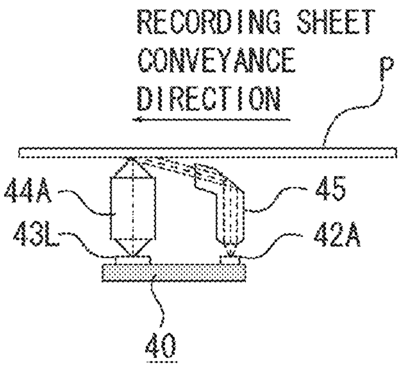
FIG. 14C is a side view of the recording paper surface detection apparatus according to the fourth exemplary embodiment.

A recording paper surface detection apparatus 40 according to a fourth exemplary embodiment will be described below. FIG. 14A is a perspective view of a recording paper surface detection apparatus according to the present exemplary embodiment, FIG. 14B is a top view thereof, and FIG. 14C is a side view thereof.

The recording paper surface detection apparatus 40 according to the present exemplary embodiment includes the illumination LEDs 42A and 42B as light sources, a CMOS line sensor 43L as an image capture device, an imaging lens array 44A as an imaging method, and further a light guide element 45 for guiding the light from the illumination LEDs 42A and 42B to the surface of the recording paper. Other elements are equivalent to those of the first, second, and third exemplary embodiments and therefore descriptions of these elements will be omitted.

In the present exemplary embodiment, a standard chip type white LED (model number NSSW100CT from Nichia Corporation) is used for the illumination LEDs 42A and 42B as light sources. The light beams emitted from the illumination LEDs 42A and 42B enter the light guide element 45 and are subjected to the effect of reflection and refraction therein. As a consequence, the light beams exiting the light guide element 45 illuminate two portions on the same straight line perpendicularly intersecting with the recording sheet conveyance direction at 15 degrees with respect to the surface of the recording sheet P.

The CMOS line sensor 43L and the imaging lens array 44A are disposed so that their respective longitudinal directions perpendicularly intersect with the recording sheet conveyance direction. This configuration enables image capturing of the two light illuminated areas (first and second light illuminated areas) on the straight line perpendicularly intersecting with the recording sheet conveyance direction illuminated with the illumination LEDs 42A and 42B. The first and second light illuminated areas are different areas such as by being completely separate and detached from each other, by having different shapes, or by having different amounts of surface enclosed within a boundary.

The thus-configured recording paper surface detection apparatus 40 is operated in away similar to the third exemplary embodiment to detect surface conditions of the recording sheet P and, based on the result of detection, controls image forming conditions of the image forming unit, such as the optimal transfer bias and fixing temperature.

As mentioned above, in the present exemplary embodiment, images of areas illuminated with light of two light sources from two different directions are captured similarly to the first, second, and third exemplary embodiments. This configuration enables reducing the dependency of the detection result on the fiber arrangement direction of the recording sheet and accordingly decreases variation in detection result, thus improving the surface unevenness determination accuracy.

Further, in the present exemplary embodiment, the light from the illumination LEDs is radiated onto the surface of the recording paper P via the light guide element 45 to compensate the optical paths within the light guide element 45, enabling the miniaturization of the recording paper surface detection apparatus. For example, the recording paper surface detection apparatus illustrated in FIG. 14 enables reducing depth by about 40% in comparison with FIG. 12 (from D to D×0.6). Further, the use of the light guide element 45 makes it possible to dispose low-price chip type illumination LEDs on the same substrate as the image capture device (area sensor or line sensor), so that cost reduction can be achieved.

Figure 15A:
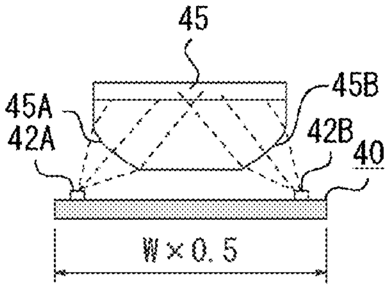
FIG. 15A is an elevational view of a recording paper surface detection apparatus according to a modification of the fourth exemplary embodiment.
Figure 15B:
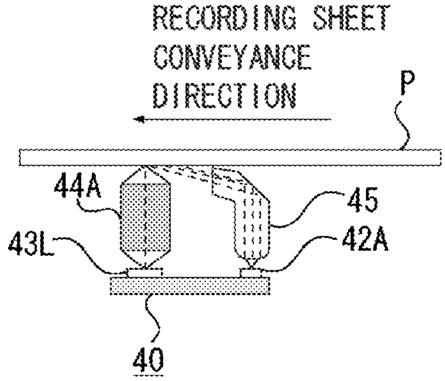
FIG. 15B is a side view of the recording paper surface detection apparatus according to the fourth exemplary embodiment.

A recording paper surface detection apparatus 40 according to a modification of the present exemplary embodiment is illustrated in FIGS. 15A and 15B. FIG. 15A is an elevational view of the recording paper surface detection apparatus 40 viewed from the downstream side of the conveyance direction, and FIG. 15B is a side view thereof. As illustrated in FIGS. 15A and 15B, the incidence surface of the light guide element 45 is provided with a first lens portion 45A and a second lens portion 45B, each having a cross section showing curvature, corresponding to light from the illumination LEDs 42A and 42B, respectively. The light beams from the illumination LEDs 42A and 42B are put in parallel with each other by the lens portions 45A and 45B of the light guide element 45, respectively. This configuration enables reducing the space between the two illumination LEDs in the width direction of the recording sheet surface detection apparatus 40, making possible further miniaturization thereof. For example, the recording paper surface detection apparatus 40 illustrated in FIG. 15 enables reducing width to about 50% in comparison with that in FIG. 9 (from W to W×0.5). Further, the lens portions 45A and 45B on the incidence surface of the light guide element 45 are provided with a function for putting light beams in parallel with each other, making it possible to put the diverging light beams from respective illumination LEDs in parallel with each other and radiate the parallel light beams onto the recording sheet obliquely with respect to the surface thereof. Accordingly, it becomes possible to ensure a sufficient light quantity for attaining the improvement in signal-to-noise (S/N) ratio and image forming speed. Thus, shadow reflecting the surface unevenness on the recording sheet can be emphasized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-098145 filed Apr. 14, 2009, which is hereby incorporated by reference herein in its entirety.

What is claimed is:

1. An image forming apparatus comprising:

an image forming unit for forming an image on a recording sheet;

a light source configured to emit a first light beam and a second light beam;

an image capture device configured to capture an area to be illuminated by the first light beam on a surface of the recording sheet as a first image, and an area to be illuminated by the second light beam on the surface of the recording sheet as a second image;

a control unit for controlling an image forming condition for the image forming unit based on information obtained from the first image and the second image, wherein the area to be illuminated by the first light beam and the area to be illuminated by the second light beam are on a same surface of the recording sheet, wherein a first straight line including a ray in a center of the first light beam and a second straight line including a ray in a center of the second light beam intersect with each other when each straight line is projected onto the surface of the recording sheet, and wherein a first area captured as the first image and the area illuminated by the second light beam do not overlap each other on the surface of the recording sheet and a second area captured as the second image and the area illuminated by the first light beam do not overlap each other on the surface of the recording sheet.

2. The image forming apparatus according to claim 1, wherein the light source includes a first light source configured to emit the first light beam and a second light source configured to emit the second light beam, and wherein the ray in the center of the first light beam and the ray in the center of the second light beam are configured to intersect with each other when each ray is projected on the surface of the recording sheet.

3. The image forming apparatus according to claim 2, wherein the image capture device includes a first light receiving unit configured to receive light from the area illuminated by the first light beam and a second light receiving unit configured to receive light from the area illuminated by the second light beam, wherein the first light receiving unit is disposed at a position apart from the area illuminated by the first light beam in a direction approximately perpendicular to the surface of the recording sheet, and the second light receiving unit is disposed at a position apart from the area illuminated by the second light beam in a direction approximately perpendicular to the surface of the recording sheet.

4. The image forming apparatus according to claim 2, wherein the image capture device includes a first lens that transmits light from the area illuminated by the first light beam toward the image capture device, and a second lens that transmits light from the area illuminated by the second light beam toward the image capture device, and wherein projection of the image capture device is positioned within a formed quadrangular area formed by connecting four projected center points of the center of first light source, the center of the second light source, a center of the area illuminated by the first light beam, and a center of the area illuminated by the second light beam.

5. The image forming apparatus according to claim 1, wherein the first straight line and the second straight line are inclined with respect to a direction in which the recording sheet is conveyed when each of the first and second straight lines is projected onto the surface of the recording sheet.

6. The image forming apparatus according to claim 1, wherein the control unit controls the image forming condition to be appropriate for unevenness of the surface of the recording sheet on which an image is formed based on the information obtained from the first image and the second image.

7. The image forming apparatus according to claim 6, further comprising:

an obtaining unit for obtaining information about the unevenness of the surface of the recording sheet based on contrast of the first image and contrast of the second image, wherein the control unit controls the image forming condition based on the information obtained by the obtaining unit.

8. The image forming apparatus according to claim 1, wherein the light ray in the center of the first light beam and the light ray in the center of the second light beam are incident on the surface of the recording sheet from a direction inclined with respect to the surface of the recording sheet.

9. An image forming apparatus comprising:

an image forming unit for forming an image on a recording sheet;

a first light source for emitting a first light beam and a second light source for emitting a second light beam;

an image capture device configured to capture an area to be illuminated by the first light beam on a surface of the recording sheet as a first image, and an area to be illuminated by the second light beam on the surface of the recording sheet as a second image; and a control unit for controlling an image forming condition for the image forming unit based on information obtained from the first image and the second image, wherein, when a light ray in a center of the first light beam, a light ray in a center of the second light beam, the first light source, and the second light source are projected on the surface of the recording sheet, the two projected light rays intersect with each other between the first light illuminated area and the projected first light source and between the second light illuminated area and the projected second light source.

10. The image forming apparatus according to claim 9, wherein the image capture device includes a first lens that transmits light from the first light illuminated area, a second lens that transmits light from the second light illuminated area, a first light receiving unit that receives light transmitted by the first lens and a second light receiving unit that receives light transmitted by the second lens, and wherein projection of the first light receiving unit and the second light receiving unit are positioned within a formed quadrangular area formed by connecting four projected center points of the center of the first light source, the center of the second light source, a center of the first lens, and a center of the second lens.

11. The image forming apparatus according to claim 9, wherein the image capture device includes a first light receiving unit that receives light from the first light illuminated area and a second light receiving unit that receives light from the second light illuminated area, and wherein the first light receiving unit is disposed at a position apart from the first light illuminated area in a direction perpendicular to the surface of the recording sheet, and the second light receiving unit is disposed at a position apart from the second light illuminated area in the direction perpendicular to the surface of the recording sheet.

12. The image forming apparatus according to claim 9, wherein the light ray in the center of the first light beam and the light ray in the center of the second light beam are incident on the surface of the recording sheet from a direction inclined with respect to the surface of the recording sheet.

13. The image forming apparatus according to claim 9, wherein the control unit controls the image forming condition to be appropriate for unevenness of the surface of the recording sheet on which an image is formed based on the information obtained from the first image and the second image.

14. The image forming apparatus according to claim 13, further comprising:

an obtaining unit for obtaining information about the unevenness of the surface of the recording sheet based on contrast of the first image and contrast of the second image, wherein the control unit controls the image forming condition based on the information obtained by the obtaining unit.

15. The image forming apparatus according to claim 9, wherein the light ray in a center of the first light beam and the light ray in a center of the second light beam are inclined with respect to a direction in which the recording sheet is conveyed when each of the first and second straight lines is projected onto the surface of the recording sheet.

16. The image forming apparatus according to claim 9, wherein the light ray in the center of the first light beam and the light ray in the center of the second light beam are incident on the surface of the recording sheet from a direction inclined with respect to the surface of the recording sheet.

17. The image forming apparatus according to claim 9, wherein the area to be illuminated by the first light beam and the area to be illuminated by the second light beam are on a same surface of the recording sheet.

18. An image forming apparatus comprising:

an image forming unit for forming an image on a recording sheet;

a light source for emitting a first light beam and a second light beam;

an image capture device for capturing an area illuminated by the first light beam on a surface of the recording sheet as a first image and capturing an area illuminated by the second light beam on the surface of the recording sheet as a second image;

an obtaining unit for obtaining information about unevenness of the surface of the recording sheet based on the first image and the second image; and a control unit for controlling an image forming condition for the image forming unit based on the information, wherein, when a first straight line including a light ray in a center of the first light beam and a second straight line including a light ray in a center of the second light beam are projected on the surface of the recording sheet, the projected first and second straight lines intersect with each other, and wherein the obtaining unit obtains information about unevenness of the surface of the recording sheet based on contrast of the first image and contrast of the second image.

19. The image forming apparatus according to claim 18, wherein the obtaining unit obtains information about unevenness of the surface of the recording sheet by using an average value of contrast of the first image and contrast of the second image.

* * * * *